US007877680B2

(12) United States Patent
Arun et al.

(10) Patent No.: US 7,877,680 B2
(45) Date of Patent: Jan. 25, 2011

(54) AUTO-GENERATION AND AUTO-VERSIONING OF A MULTI-SOURCED DYNAMIC DOCUMENT

(75) Inventors: Jai S. Arun, Morrisville, NC (US); David N. Brauneis, Jr., Raleigh, NC (US); Rohit D. Kelapure, Durham, NC (US); Dana R. Thalheimer, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 11/688,726

(22) Filed: Mar. 20, 2007

(65) Prior Publication Data

US 2008/0235569 A1 Sep. 25, 2008

(51) Int. Cl.
*G06F 17/00* (2006.01)
(52) U.S. Cl. .................. 715/229; 715/201; 715/255; 715/271
(58) Field of Classification Search .................. 715/200, 715/201, 203, 204, 229, 255, 271
See application file for complete search history.

(56) References Cited

U.S. PATENT DOCUMENTS

| 5,895,476 | A | * | 4/1999 | Orr et al. ............... 715/202 |
| 5,920,867 | A | * | 7/1999 | Van Huben et al. ........ 707/101 |
| 6,035,297 | A | * | 3/2000 | Van Huben et al. ............ 707/8 |
| 7,237,160 | B2 | * | 6/2007 | Lu et al. .................... 714/724 |
| 2002/0184610 | A1 | * | 12/2002 | Chong et al. ............... 717/109 |
| 2004/0215978 | A1 | * | 10/2004 | Okajo et al. ............... 713/201 |
| 2005/0076066 | A1 | * | 4/2005 | Stakutis et al. ............. 707/200 |
| 2005/0086377 | A1 | * | 4/2005 | Aso ........................... 709/245 |
| 2005/0278625 | A1 | | 12/2005 | Wessling et al. |
| 2006/0080582 | A1 | * | 4/2006 | Lu et al. .................... 714/724 |
| 2006/0130041 | A1 | * | 6/2006 | Pramanick et al. .......... 717/168 |

FOREIGN PATENT DOCUMENTS

EP 0917074 A2 5/1999

OTHER PUBLICATIONS

Martinez, M. et al. "A Method for the Dynamic Generation of Virtual Versions of Evolving Documents," pp. 476-482, SAC 2002, Madrid, Spain.
Martinez, M. et al. "Relationship-Based Dynamic Versioning of Evolving Legal Documents," Web Knowledge Management and Decision Support. 14th Int'l Conference on Applications of Prolog, INAP 2001. Revised Papers, Tokyo Japan, Oct. 20-22, 2001. Copyright 2003, IEE, 1 page.

(Continued)

*Primary Examiner*—Stephen S Hong
*Assistant Examiner*—Gregory J Vaughn
(74) *Attorney, Agent, or Firm*—Law Office of Jim Boice

(57) ABSTRACT

A computer-implementable method, system and computer media for auto-generating and auto-versioning a dynamic document are presented. In a preferred embodiment, the computer-implementable method includes populating a dynamic document with content from multiple sources. The dynamic document is then version named in accordance with a nomenclature rule that identifies a source and version of content from the multiple sources. In response to a content from one or more of the multiple sources changing at a source, the dynamic document is updated with updated content, and a version name of the dynamic document is updated to reflect the updated content.

20 Claims, 3 Drawing Sheets

OTHER PUBLICATIONS

Ponnekanti, S. et al. "Interoperability Among Independently Evolving Web Services," pp. 331-351, H.-A. Jacobsen (Ed.): Middleware 2004, LNCS 3231, 2004.

Weber, A. et al. "Live Documents with Contextual, Data-Driven Information Components," pp. 236-247, SIGDOC '02, Oct. 20-23, 2002, Toronto, Ontario, Canada.

* cited by examiner

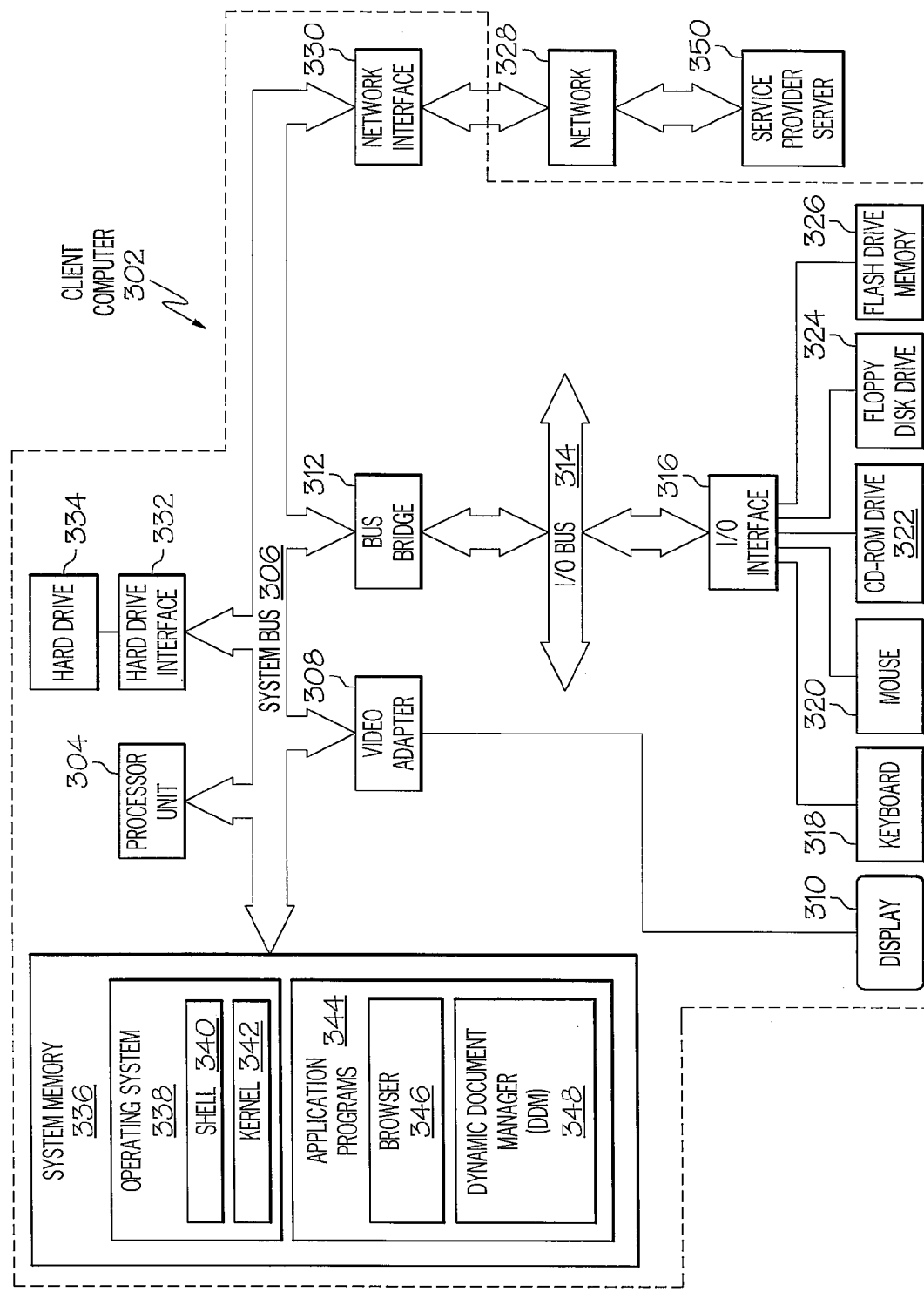

AUTO-GENERATION AND AUTO-VERSIONING OF A MULTI-SOURCED DYNAMIC DOCUMENT

BACKGROUND OF THE INVENTION

The present invention relates in general to the field of computers and other data processing systems, including hardware, software and processes. More particularly, the present invention pertains to auto-generating and auto-versioning a multi-sourced dynamic document.

Computer documents are typically stand-alone works, in which all components of the document are self-contained within the computer document. Despite the computer document being self-contained at run-time, data from other content sources may be used in the construction of the computer document. That is, a computer document can be constructed by pulling information from other content sources, and consolidating that information into a single self-contained document. However, if the information itself changes at the other content source, then the computer document may be out of date (stale). Furthermore, the construction of the computer document is typically manually performed by a programmer, and thus is time and labor intensive, as well as being error-prone.

SUMMARY OF THE INVENTION

Presently disclosed are a computer-implementable method, system and computer media for auto-generating and auto-versioning a dynamic document. In a preferred embodiment, the computer-implementable method includes populating a dynamic document with content from multiple sources. The dynamic document is then version named in accordance with a nomenclature rule that identifies a source and version of content from the multiple sources. In response to a content from one or more of the multiple sources changing at a source, the dynamic document is updated with updated content, and a version name of the dynamic document is updated to reflect the updated content.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 3 depicts an exemplary computer in which the present invention may be implemented.

DETAILED DESCRIPTION OF THE PREFERRED EMBODIMENT

Figure 1:
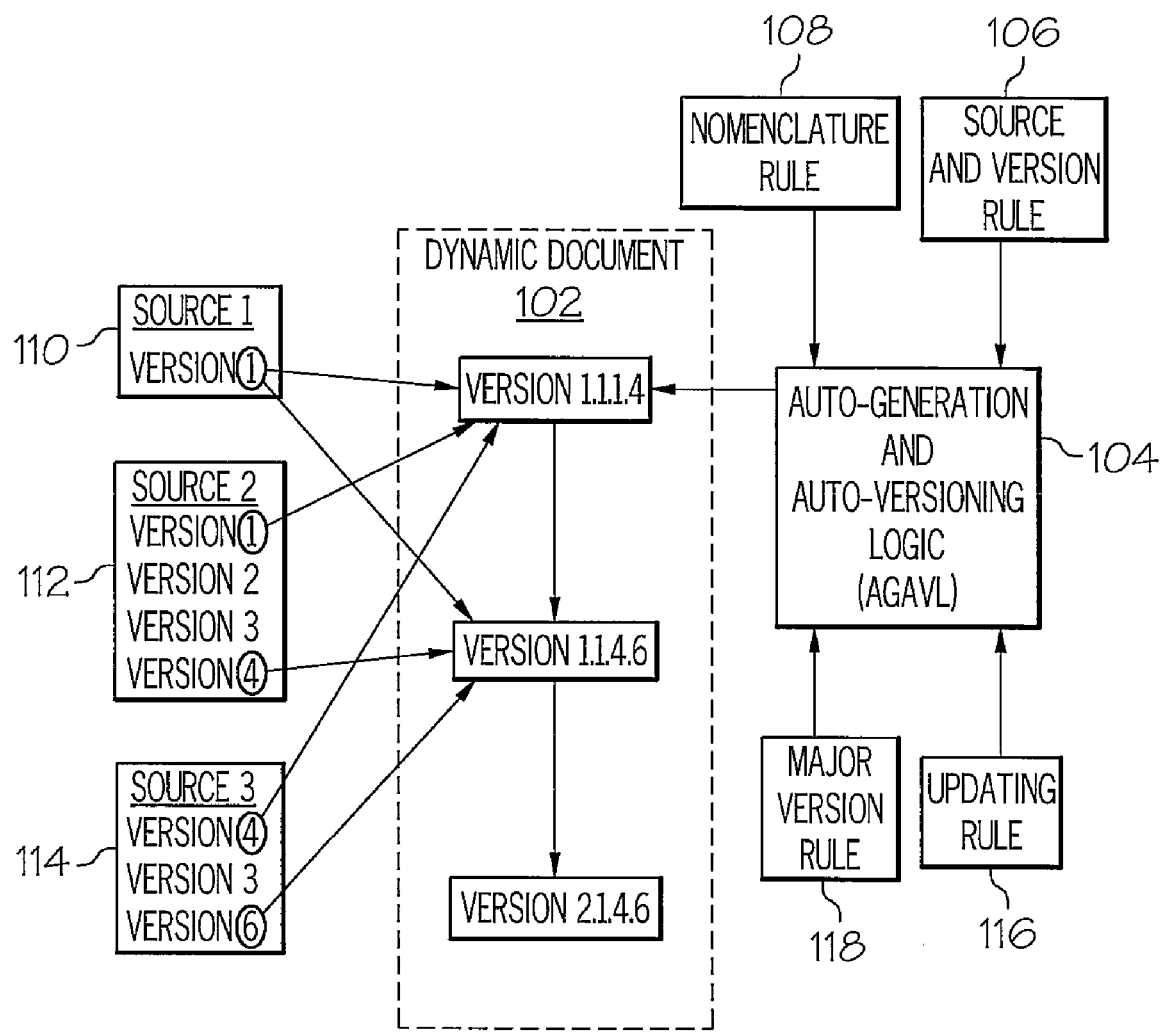
FIG. 1 depicts the auto-generation and auto-versioning of a multi-sourced dynamic document.

It is noted here that the present disclosure is directed only to dynamic documents that are stand-alone documents when ready to be read (in the case of a text document) or compiled (in the case of a computer program). Thus, in the case of a computer program dynamic document, a dynamic document is defined herein as a document that, at run-time, contains no active links to other documents. For example, as defined herein, a dynamic document is not a webpage that has active links to other webpages, etc. Rather, a dynamic document is able to populate and update itself during creation and upgrades, as described herein, but when ready to be run (or compiled), all code is self-contained within the dynamic document itself, without the use of pointers, links, etc. to other documents, webpages, etc. Thus, the present invention does not simply assign a next sequential number to a newest version of a document, since doing so does not provide a real time view and an understanding of how a document is constructed from several different sources. Furthermore, the present invention does not use links (e.g., portals), since using such links to create a document does not provide detailed versioning information or document persistence.

In the case of a text document, a dynamic document is defined as a complete text document that, when published, contains no active links to outside sources. That is, content that makes up the dynamic (text) document may be pulled from outside sources while the dynamic document is being created or updated under the control of a local editor, but, when published to a reader, the dynamic document contains no active links to outside sources.

As described above, documents often pull information from many sources. Once data is in a document, that document runs the risk of becoming stale as the original sources change. In a preferred embodiment of the presently disclosed invention, these documents are auditable and have a date and time associated with versions of the document.

As an exemplary environment in which the present invention may be implemented, IBM's WebSphere™ uses multiple "towers" of information such as Line Item Data Base, Test Tracking Tool, Configuration Management and Version Control (CMVC), etc. Often information must be copied from one of these locations into another in order to comply with a process or generate a required document. Every time information is copied, an opportunity for error is created, leading to reduced efficiency. Thus, the present invention permits the dynamic pulling of information from original sources and rendering that pulled information in a predetermined required format. Examples of documents created within a system such as Websphere™ include Test Overview Documents and System Design Documents.

Test Overview Documents require a list of the test scenarios that are going to be run in the particular test phase to which a test program is relevant. The definitive source of that information is the list of Execution Records for the component, milestone, and test phase.

System Design Documents contain use cases. A use case describes a sequence of events that, when taken together, lead to a system that is capable of performing a desired function. Most use cases are actually test cases. Through the use of the presently disclosed invention, use cases can be written and stored so that both the software developer and the tester can use the use case without copying or re-writing.

With reference now to the figures, and in particular to FIG. 1, an exemplary dynamic document 102, which is auto-generated and auto-versioned in accordance with the present invention, is depicted. Dynamic document 102 is initially auto-generated in accordance with instructions found in an Auto-Generation and Auto-Versioning Logic (AGAVL) 104, which is a software program in a preferred embodiment. AGAVL 104 is software logic that initially receives inputs from a source and version rule 106 and a nomenclature rule 108. The source and version rule 106 defines which sources the dynamic document 102 should use to pull in document sub-components (i.e., content) used to build the dynamic document 102. The nomenclature rule 108 defines how the dynamic document 102 is named (e.g., version numbering protocol). For example, assume that source and version rule 106 states that the dynamic document 102 is to utilize document subcomponents (content) from Source 1 (110), Source 2 (112) and Source 3 (114). Furthermore, the source and version rule 106 states that Version 1 of the content from Source 1, Version 1 of the content from Source 2, and Version 4 of the content from Source 3 is to be utilized to initially build dynamic document 102. From these version numbers (which may or may not correlate exactly to the numbering system used), the nomenclature rule 108 instructs AGAVL 104 to give dynamic document 102 a version number of "1.1.1.4". "Version 1.1.1.4" represents, in accordance with nomenclature rule 108, that this is "Major Version 1" of dynamic document 102 (as indicated by the leading "1" in the version number), and that Versions 1, 1, and 4 of content from respective Sources 1, 2, and 3 are being utilized in the initial construction of dynamic document 102.

In accordance with AGAVL 104's direction and control, at a subsequent time dynamic document 102 may be updated. This upgrade may be performed any time a source content is updated, after a pre-determined period of time, or in accordance with any rule defined in an updating rule 116. In the example shown in FIG. 1, such updating has occurred to create Version 1.1.4.6, in which content versions 1, 4, and 6 from respective Sources 1, 2, and 3 are used to update dynamic document 102. This new version nomenclature ("Version 1.1.4.6") has been created in accordance with the nomenclature rule 108, and under the naming direction and control of AGAVL 104.

At some point, the major version nomenclature (i.e., the leading numeric indicator) may need to be updated, in accordance with a major version rule 118. For example, after the dynamic document 102 has been updated a predetermined number of times, after a predetermined date, after a predetermined amount of time, after content from a particular source is updated, after updated content contains some pre-specified content data (e.g., a particular type of section of code, a string of characters, etc.), after content from a particular author is incorporated into dynamic document 102, etc., then the major version nomenclature (e.g., a first number in the version number) may be changed. Version 1.1.4.6 of dynamic document 102 may be changed to Version 2.1.4.6, in accordance with the rule in major version rule 118.

Figure 2:
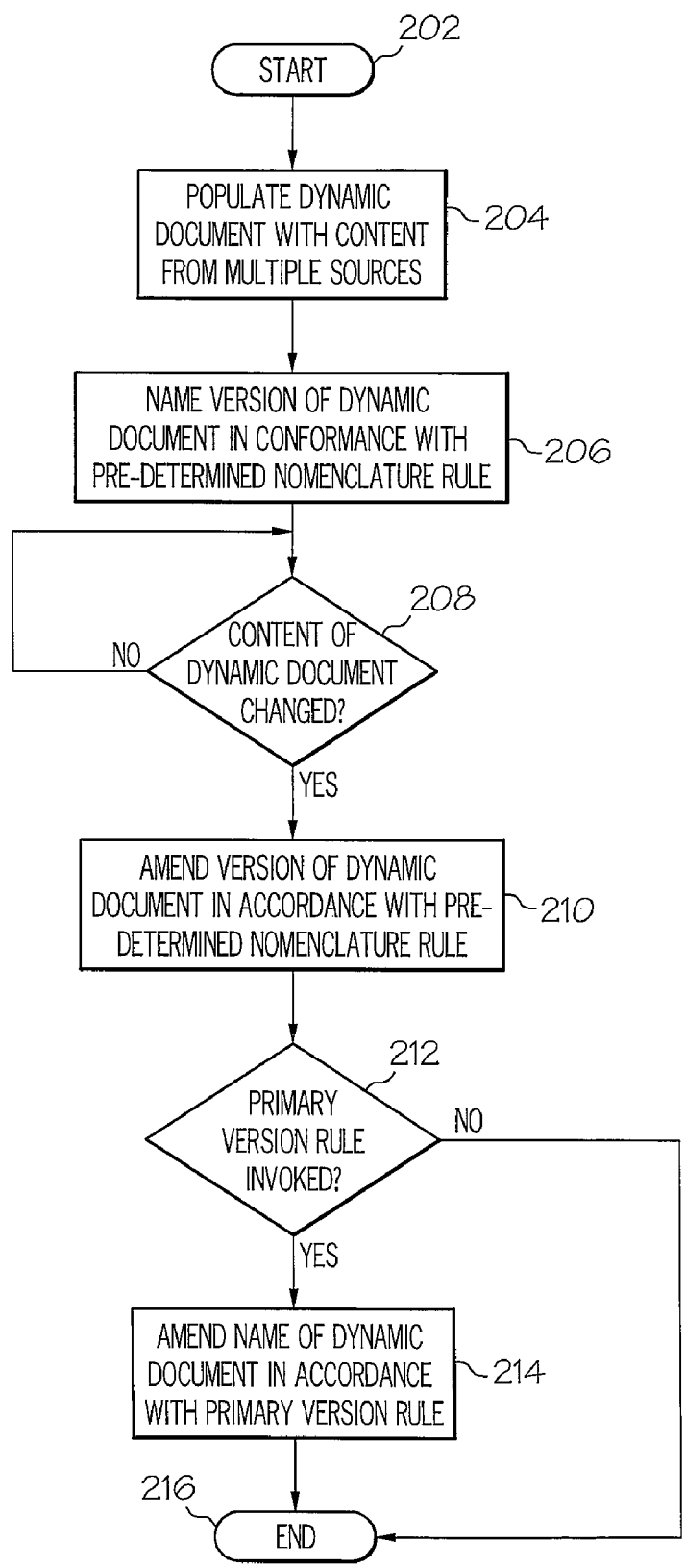
FIG. 2 is a flow-chart of exemplary steps taken by a computer to auto-generate and auto-version the multi-sourced dynamic document described in FIG. 1.

With reference now to FIG. 2, a flow-chart of exemplary steps taken in accordance with the present invention for auto-generating and auto-versioning a dynamic document is presented. After initiator block 202, AGAVL 104 (shown in FIG. 1) populates a dynamic document with content from multiple sources (block 204). As described above, this content may be sub-components of the dynamic document. For example, if dynamic document is a text document, then the sub-components may be sections of the entire text document. If the dynamic document is a software program, such as a test program, then the content may be subroutines, classes or other software components that are used to make up the entire software program (dynamic document). These examples are those used in various preferred embodiments of the present invention, but should not be construed as limiting the scope of the present disclosure. Note again that, in a preferred embodiment, the population of the dynamic document is automatically performed under the control of the AGAVL 104 described above in FIG. 1.

As illustrated at block 206, the version name of the dynamic document may be assigned by the AGAVL 104, in a manner described above in FIG. 1. As shown in query block 208, a query can then be made to determine if the content of the dynamic document has changed. This content change may be in response to a new content version appearing in a source, a new or particular author's work appearing in a source, etc., as discussed above with reference to FIG. 1. If the content of the dynamic document has changed, then the version name of the dynamic document changes accordingly (block 210). Note that the naming convention described in nomenclature rule 108 (shown in FIG. 1) allows a user to "go back in time" to look at a previous version of the dynamic document. For example, if a user or computer is using or has access to a previous version of the dynamic document, the actual content used by that previous version can be identified and examined by the user or computer. Thus, the nomenclature rule described herein allows each section of the version number to describe both the source and version of each imported sub-content of the dynamic document.

As shown in query block 212 and block 214, if the major nomenclature (e.g., the leading numeral in the version numbering system) needs to be changed, for reasons described above, then the primary (major) number in the version number is updated in accordance with the major version rule 118 described in FIG. 1. The process then ends at terminator block 216, or may return to query block 208 in an iterative manner.

Note again that through the use of the nomenclature and document construction rules and techniques described herein, an earlier (previous) version of a dynamic document can be reconstructed. That is, by utilizing the rules described herein, a reconstructed document can be created by pulling in previous versions of content from the various sources.

With reference now to FIG. 3, there is depicted a block diagram of an exemplary client computer 302, in which the present invention may be utilized. Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with a service provider server 350 via a network 328 using a network interface 330, which is coupled to system bus 306. Network 328 may be an external network such as the Internet, or an internal network such as an Ethernet or a Virtual Private Network (VPN).

A hard drive interface 332 is also coupled to system bus 306. Hard drive interface 332 interfaces with a hard drive 334. In a preferred embodiment, hard drive 334 populates a system memory 336, which is also coupled to system bus 306. System memory is defined as a lowest level of volatile memory in client computer 302. This volatile memory may include additional higher levels of volatile memory (not shown), including but not limited to cache memory, registers, and buffers. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with service provider server 350.

Application programs 344 in client computer 302's system memory also include a Dynamic Document Manager (DDM) 348, which includes code for implementing the processes described in FIGS. 1-2, and comprises AGAVL 104, source and version rule 106, nomenclature rule 108, updating rule 116, and major version rule 118 described above.

In one embodiment, client computer 302 is able to download DDM 348 from service provider server 350, preferably in an "on demand" basis.

Note that the hardware architecture for service provider server 350 may be substantially similar to that shown for client computer 302.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 350 performs all of the functions associated with the present invention (including execution of DDM 348), thus freeing client computer 302 from using its own resources.

It should be understood that at least some aspects of the present invention may alternatively be implemented in a computer-useable medium that contains a program product. Programs defining functions of the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of DDM 348, are performed by service provider server 350. Alternatively, DDM 348 can be deployed as software from service provider server 350 to client computer 302. This deployment may be performed in an "on demand" basis manner, in which DDM 348 is only deployed when needed by client computer 302. In another embodiment, process software for the method so described may be deployed to service provider server 350 by another service provider server (not shown).

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method for auto-generating and auto-versioning a dynamic document, the computer-implementable method comprising:

populating a dynamic document with content from multiple sources;

version naming the dynamic document in accordance with a nomenclature rule, wherein the nomenclature rule identifies a source and version of content from the multiple sources by utilizing pre-defined field positions in a name of the dynamic document, and wherein the pre-defined field positions identify a specific content source from the multiple sources and a content version from the specific content source; and in response to a content, from one or more of the multiple sources, changing at a source, updating the dynamic document with updated content, and updating a version name of the dynamic document to reflect the updated content.

2. The computer-implementable method of claim 1, further comprising:

reading the version name of the dynamic document; and based on information contained in the version name of the dynamic document, identifying which version of content from the multiple sources populated the dynamic document.

3. The computer-implementable method of claim 1, wherein content of at least one of the multiple sources is another dynamic document.

4. The computer-implementable method of claim 1, further comprising:

determining if an update to the dynamic document has invoked a primary version rule, wherein the primary version rule mandates that a primary nomenclature element in the version name be changed if the dynamic document has been updated more than a predetermined number of times; and in response to the primary version rule being invoked, renaming the dynamic document to represent that the primary version rule has been invoked.

5. The computer-implementable method of claim 1, further comprising:
determining if an update to the dynamic document has invoked a primary version rule, wherein the primary version rule mandates that a primary nomenclature element in the version name be changed if the dynamic document has been updated by content provided from a specifically defined author; and
in response to the primary version rule being invoked, renaming the dynamic document to represent that the primary version rule has been invoked.

6. The computer-implementable method of claim 1, further comprising:
determining if an update to the dynamic document has invoked a primary version rule, wherein the primary version rule mandates that a primary nomenclature element in the version name be changed if the dynamic document has been updated by content that contains pre-specified content data; and
in response to the primary version rule being invoked, renaming the dynamic document to represent that the primary version rule has been invoked.

7. The computer-implementable method of claim 1, further comprising:
reconstructing a previous version of the dynamic document by populating a reconstructed document with previous content from the multiple sources, wherein the previous content is identified by a previous version name of the dynamic document.

8. The computer-implementable method of claim 1, wherein the nomenclature rule assigns each of the multiple sources a hierarchical number, wherein the version name represents a hierarchical order of the multiple sources, and wherein a major nomenclature change is based on a hierarchical number assigned to a major source.

9. The computer-implementable method of claim 1, wherein content from the multiple sources is copied from the multiple sources and pasted into the dynamic document.

10. The computer-implementable method of claim 1, wherein the dynamic document is a text document.

11. A system comprising:
a processor;
a data bus coupled to the processor;
a memory coupled to the data bus; and
a computer-usable medium embodying computer program code, the computer program code comprising instructions executable by the processor and configured for auto-generating and auto-versioning a multi-sourced dynamic document by:
populating a dynamic document with content from multiple sources;
version naming the dynamic document in accordance with a nomenclature rule, wherein the nomenclature rule identifies a source and version of content from the multiple sources by utilizing pre-defined field positions in a name of the dynamic document, and wherein the pre-defined field positions identify a specific content source from the multiple sources and a content version from the specific content source; and
in response to a content, from one or more of the multiple sources, changing at a source, updating the dynamic document with updated content, and updating a version name of the dynamic document to reflect the updated content.

12. The system of claim 11, wherein the instructions are further configured for performing the steps of:
reading the version name of the dynamic document; and
based on information contained in the version name of the dynamic document, identifying which version of content from the multiple sources populated the dynamic document.

13. The system of claim 11, wherein content of at least one of the multiple sources is another dynamic document.

14. The system of claim 11, wherein the instructions are further configured for performing the steps of:
determining if an update to the dynamic document has invoked a primary version rule, wherein the primary version rule mandates that a primary nomenclature element in the version name be changed if the dynamic document has been updated more than a predetermined number of times; and
in response to the primary version rule being invoked, renaming the dynamic document to represent that the primary version rule has been invoked.

15. The system of claim 11, wherein the dynamic document is a computer program.

16. A computer-readable storage medium encoded with a computer program, the computer program comprising computer executable instructions configured for:
populating a dynamic document with content from multiple sources;
version naming the dynamic document in accordance with a nomenclature rule, wherein the nomenclature rule identifies a source and version of content from the multiple sources by utilizing pre-defined field positions in a name of the dynamic document, and wherein the pre-defined field positions identify a specific content source from the multiple sources and a content version from the specific content source; and
in response to a content, from one or more of the multiple sources, changing at a source, updating the dynamic document with updated content, and updating a version name of the dynamic document to reflect the updated content.

17. The computer-readable storage medium of claim 16, wherein the executable instructions are further configured for performing the steps of:
reading the version name of the dynamic document; and
based on information contained in the version name of the dynamic document, identifying which version of content from the multiple sources populated the dynamic document.

18. The computer-readable storage medium of claim 16, wherein content of at least one of the multiple sources is another dynamic document.

19. The computer-readable storage medium of claim 16, wherein the computer-usable medium is a component of a remote server, and wherein the computer executable instructions are deployable to a supervisory computer from the remote server.

20. The computer-readable storage medium of claim 16, wherein the computer executable instructions are capable of being provided by a service provider to a customer on an on-demand basis.

* * * * *